United States Patent [19]

Matsuoka et al.

[11] 3,962,146
[45] June 8, 1976

[54] PTC THERMISTOR COMPOSITION AND METHOD OF MAKING THE SAME

[75] Inventors: Tomizo Matsuoka, Neyagawa; Masanori Fujimura, Hirakata; Yoshihiro Matsuo, Neyagawa, all of Japan

[73] Assignee: Matsushita Electric Industrial Co., Ltd., Japan

[22] Filed: Sept. 18, 1974

[21] Appl. No.: 506,963

[30] Foreign Application Priority Data

Sept. 24, 1973  Japan............................ 48-107393

[52] U.S. Cl.............................. 252/520; 252/521; 106/46; 106/73.31
[51] Int. Cl.$^2$.......................................... H01B 1/08
[58] Field of Search.......................... 252/520, 521; 106/73.31, 46 A

[56] References Cited
UNITED STATES PATENTS

| | | | |
|---|---|---|---|
| 3,373,120 | 3/1968 | Nitta et al............................ | 252/520 |
| 3,586,642 | 6/1971 | Matsuo et al........................ | 252/520 |
| 3,673,119 | 6/1972 | Ueoka et al. ........................ | 252/520 |

FOREIGN PATENTS OR APPLICATIONS

| | | | |
|---|---|---|---|
| 809,439 | 2/1959 | United Kingdom............... | 106/46 A |

OTHER PUBLICATIONS

Chemical Abstracts 68, 109126a "Nature of the Formation of Semiconductor Properties in Alloyed Barium Titanate."

Chemical Abstracts 79, 98450a "Barium Titanate Type Thermistors."

*Primary Examiner*—Benjamin R. Padgett
*Assistant Examiner*—E. Suzanne Parr
*Attorney, Agent, or Firm*—Wenderoth, Lind & Ponack

[57] ABSTRACT

A PTC thermistor composition containing barium oxide and titanium oxide as a base material, a semiconducting element to make the base material semiconductive and hafnium dioxide, and if necessary, an additive element. Due to the use of hafnium dioxide, the thermistor composition contributes to a large positive temperature coefficient of resistance. This invention also provides a novel method of making the thermistor composition, in which the addition of hafnium is carried out at the step of milling which comes after the step of calcining. By this method, hafnium can be very effectively used.

7 Claims, No Drawings

PTC THERMISTOR COMPOSITION AND METHOD OF MAKING THE SAME

This invention relates to a PTC thermistor composition, more particularly to a ceramic PTC thermistor, in which PTC represents positive temperature coefficient of electrical resistance. This invention also provides a method of producing the PTC thermistor. It is well known that barium titanate ceramics exhibit a semiconduction when employed with a small amount of ions such as rare earth element, Bi, Sb, Nb and Ta. These elements can be called semiconducting elements to make barium titanate (base material) semiconductive, and are disclosed by P. W. Haayman et al. in German Patent No. 631,321(1951). After the disclosure by P. W. Haayman et al., many improvements of PTC characteristics for various applications have been tried. It was found by H. Ueoka et al. in Japanese Patent 41–12146 (1966) and Japanese Patent 42–3855(1967) that semiconductive barium titanate ceramics doped with a small amount of rare earth element, Bi and Sb showed a large positive temperature coefficient of resistivity and a large variation of the resistivity in the PTC temperature region when being incorporated with 0.002 to 0.03 percent by weight of Mn ion. It was further disclosed by N. Fujikawa in Japanese Patent 47–27712 (1972) and Japanese Patent 47–41153 (1972) that semiconductive barium titanate ceramics doped with a small amount of rare earth element, Bi and Sb showed a large variation of the resistivity in the PTC region and a small voltage dependence of the resistivity in higher temperature than a Curie temperature when employed with 0.13 to 0.35 mole percent of Mn ion and with 0.2 to 15 mole percent of Si ion.

Recently, PTC thermisters have been widely applied to temperature controlling devices using its switching characteristics. In this case, the larger the resistivity-temperature coefficient $$(\alpha = \frac{1}{R} \frac{dR}{dT})$$

in the neighborhood of the Curie temperature, the more sensitive for temperature is the PTC thermistors. For actual usage, PTC thermistors having various Curie temperatures differing by 120°C from that of $BaTiO_3$, at which temperatures resistivity starts to increase abruptly, are often desired. For this reason, barium titanate solid solutions, in which Sr, Pb or Sn is partially substituted for Ba or Ti respectively, are used. But in such PTC thermistors the positive temperature coefficients become smaller as compared with barium titanate which is not substituted.

Accordingly, it is an object of this invention to provide a PTC thermistor composition contributing to a large positive temperature coefficient of resistance.

This object is achieved according to this invention by adding hafnium to the thermistor composition.

This and other objects of this invention will be apparent from the following description.

The PTC thermistor composition of this invention comprises: a base material containing barium oxide and titanium oxide; a semiconducting element to make the base material semiconductive; and hafnium dioxide; and if necessary an additive element. In this regard, the novel feature of this invention is in the use of hafnium dioxide.

It has been found that an addition of hafnium dioxide is very effective to make the positive temperature coefficient of resistivity larger than without hafnium.

The base material can be composed of barium oxide and titanium oxide. The base material can consist essentially of barium oxide, titanium oxide and one of lead oxide and strontium oxide. Further, the base material can consist essentially of barium oxide, titanium oxide and stannic oxide. Also, the base material can consist essentially of barium oxide, titanium oxide, stannic oxide and one of lead oxide and strontium oxide.

The semiconducting element to make the base material semiconductive can comprise at least one of the oxides of rare earth elements, niobium, bismuth, tantalum and antimony. Among them, most preferable semiconducting element is niobium oxide.

The additive elements which can be used, if necessary, in addition to the materials and elements as described above are e.g. manganese oxide and silicon oxide.

According to this invention, an addition of 0.05 mol % to 10 mol % of hafnium dioxide to $BaTiO_3$, $(Ba, Sr)TiO_3$, $(Ba, Pb)TiO_3$, and $Ba(Ti, Sn)O_3$ has a remarkable effect for making the positive temperature coefficient of resistivity larger. Especially, an addition of 0.1 mol % to 0.3 mol % of hafnium dioxide to barium titanate gives the largest positive temperature coefficient. Such effect from a hafnium-addition is most elevated when the hafnium dioxide is added when milling a calcined material after calcination of a mixture without hafnium dioxide in the manufacturing process.

More specifically, a preferable PTC thermistor composition according to this invention consists essentially of a first oxide selected from the group consisting of barium oxide, barium strontium oxide and barium lead oxide, and, on the basis of 1.00 mole of the first oxide, (A) 0.90 to 1.05 mole of an oxide selected from the group consisting of titanium dioxide and titanium stannic dioxide, (B) 0.0005 to 0.002 mole of an oxide selected form the group consisting of rare earth oxides, $Nb_2O_5$, $Ta_2O_5$, $Bi_2O_3$ and $Sb_2O_3$ and (C) 0.0005 to 0.10 mole of hafnium dioxide, which composition can further include (D) $1\times10^{-4}$ to $1.5\times10^{-3}$ mole of manganese oxide and/or (E) 0.006 to 0.050 mole of $SiO_2$. In this composition, the barium strontium oxide is preferably $(1-x)BaO.xSrO$ wherein $x$ is smaller than 0.70. The barium lead oxide is preferably $(1-x)BaO.xPbO$ wherein $x$ smaller than 0.80. The titanium stannic dioxide is preferably $(1-x)TiO_2.xSnO_2$ wherein $x$ is smaller than 0.25.

In manufacturing a PTC thermistor according to this invention, hafnium dioxide can be included in the starting material. However, it has been found according to this invention, that more preferably hafnium dioxide is added at the step of milling after calcination of a starting material, as set forth above. More specifically, a preferable method according to this invention comprises: preparing a starting material mixture comprising a base material, a semiconducting element to make the base material semiconductive, and if necessary an additive element such as manganese oxide and/or silicon oxide; calcining the starting material at a temperature of 900° to 1250°C; milling the thus calcined material with an addition of hafnium dioxide; pressing the thus milled material into a pressed body; firing the thus pressed body at 1240°C to 1400°C (0.5–5 hours); cooling the thus fired body to 400°C at cooling rate lower than 300°C per hour; and furnace-cooling the thus cooled body to room temperature. Except for the step of adding hafnium dioxide, all the steps of the method according to this invention are basically known in prior art.

This invention will be understood more readily with reference to the following EXAMPLE, but this EXAMPLE is intended to illustrate the invention only, and is not to be construed to limit thereby the scope of this invention.

EXAMPLE

For the preparation of representative PTC thermistor compositions, powders of $BaCo_3$, $TiO_2$, $Nb_2O_5$ and other additives such as $MnO_2$, $SiO_2$ and $HfO_2$ were well mixed by a wet ball mill, pressed into cakes at a pressure of 400Kg per cm$^2$, and calcined in air at a temperature of 1100°C for 2 hours. The calcined cakes were pulverized using the same ball mill as in mixing and then dried, pressed into disks at a pressure of 800 Kg per cm$^2$, fired in air at a temperature of 1350°C for one hour and cooled at a cooling rate of 100°C/hr. The fired disks were provided on both surfaces thereof with aluminum electrodes which showed ohmic contact with barium titanate semiconductor by a molten Al spraying method. Furthermore, copper metal was superposed on the aluminum electrodes by a molten Cu spraying method. Lead wires of nickel were attached to the electrodes by soldering with solder having a melting point of 180°C. The resultant PTC thermistors were measured with respect to the PTC characteristics, resistivities at room temperature, positive resistivity temperature coefficient, variation of resistivity Rmax/Rmin and PTC onset temperature. The positive temperature coefficient ($\alpha$) was calculated from the following equation:

$$\alpha = 2.3 \log_{10}(R_2/R_1)/(T_2-T_1)$$

where $T_1$ is PTC onset temperature, $T_2 = T_1 + 50$ (°K), $R_1$ is the electrical resistivity at $T_1$, and $R_2$ is the electrical resistivity at $T_2$.

Table 1 shows the effect on electrical properties by an addition of hafnium dioxide to a base material (barium titanate) with various semiconducting elements. It was found thereby that about 0.5 to 10 mole % of the addition of hafnium dioxide to barium titanate with semiconducting elements such as rare earth elements, $Nb_2O_5$, $Ta_2O_5$, $Bi_2O_3$ and $Sb_2O_3$ improved positive temperature coefficient and variation of resistivity Rmax/Rmin. The addition of hafnium dioxide to barium titanate also increased room temperature resistivities according to the amount of the addition and, especially resistivity was raised abruptly in the case of such addition of more than 15 mole %. Therefore, it was considered that appropriate amount of hafnium dioxide addition was 0.5 to 10 mole %. It was also found that the Curie temperature of barium titanate was lowered at a rate of 5°C/mol% according to an amount of hafnium dioxide addition. An appropriate amount of semiconducting element for barium titanate with hafnium dioxide additive was examined. The results are shown in Nos. 1–7 of Table 2. Barium titanate added hafnium dioxide was made quite semiconductive with 0.0005 to 0.0020 mole of $Nb_2O_5$ for one mole of barium titanate. It was confirmed that this amount was not much different for other semiconducting elements.

The effect of hafnium dioxide addition to barium titanate semiconductor having added thereto manganese dioxide was examined, which manganese dioxide was known in the prior art to promote PTC characteristics. It was confirmed that in barium titanate having added thereto manganese dioxide and, hafnium dioxide was effective to improve PTC characteristics as understood by comparison of positive temperature coefficients and Rmax/Rmin of No. 11 and No. 21 in Table 2 respectively. Furthermore, an appropriate amount of $MnO_2$ was added as shown in No. 8 to No. 14 in Table 2. The resistivity of barium titanate semiconductor increased according to an amount of manganese dioxide addition, and an amount of $Nb_2O_5$ addition was controlled to obtain the lowest resistivity for a given amount of manganese dioxide. Such controlled amount of $Nb_2O_5$ is apparent from No. 8 to No. 14 in Table 2. Manganese dioxide showed an effect at an amount thereof larger than $1\times10^{-4}$ mole to one mole of barium titanate, and at an amount thereof larger than $2\times10^{-3}$ mole, the resistivity of barium titanate semiconductor increased abrubtly which was not favorable to actual usage.

No. 15 to No. 20 and No. 22 in Table 2 show the effect of hafnium dioxide addition to barium titanate semiconductor having added thereto manganess dioxide and silicon dioxide, and an appropriate amount of silicon dioxide addition. It was confirmed that an addition of hafnium dioxide was effective also in this case as found by comparison between No. 18 and No. 22 in Table 2, and an appropriate amount of $SiO_2$ addition was 0.006 to 0.050 mole to one mole of barium titanate. It was found that the addition of $SiO_2$ was effective to make the average grain size of ceramics small to permit high voltage without break-down as shown in break-down voltage, and also make resistivity small.

In order to confirm an effect of hafnium dioxide addition in the case of other base materials, hafnium dioxide was further added to barium titanate having Sr and Pb substituted for Ba and also having manganese dioxide and silicon dioxide added thereto. The results are summarized in Table 3. There, $7\times10^{-4}$ mole of $MnO_2$, 0.024 mole of $SiO_2$ and 0.0011 mole of $Nb_2O_5$ were added to one mole of barium titanate. The compositions from No. 1 to No. 21 in Table 3 have a weight formula in the form of $Ba(Ti_{1-y}Hf_y)O_3$, $(Ba_{1-x}Sr_x)(Ti_{1-y}Hf_y)O_3$ and $(Ba_{1-x}Pb_x)(Ti_{1-y}Hf_y)O_3$. As the representative onset temperatures in actual usage, 50°C and 150°C were adopted. This was achieved by using Sr which decreases Curie temperature and Pb which raises Curie temperature, respectively, as shown in Table 3. All compositions from No. 1 to No. 21 in Table 3 were prepared by mixing the ingredient of the basic compositions with other additives such as $MnO_2$, $HfO_2$ and $SiO_2$ using a wet ball mill. The mixtures were calcined at 1150° C for 2 hours and then dried, fired at 1350°C for 1 hour, and cooled at a rate of 100°C/hr. to a room temperature. As shown by No. 8 and No. 15 in Table 3, the substitutions of Sr and Pb for Ba tend to decrease the positive temperature coefficients. It was found from the results in Table 3 that this disadvantage was effectively overcome by the addition of hafnium dioxide of larger than 0.5 mole %. It was also observed that the increase of added amount of hafnium dioxide increased the room temperature resistivities at the same time, and therefore the addition of hafnium dioxide is preferably smaller than 10 mole %, above which amount the resistivity rapidly increases. The positive temperature coefficients showed maximum values upon the addition of 5 mole % in the three types of basic compositions $Ba(Ti,Hf)O_3$, $(Ba,Sr)(Ti,Hf)O_3$ and $(Ba,Pb)(Ti,Hf)O_3$. From an economical point of view, because of expense of hafnium dioxide, the addition of small amount of hafnium dioxide was examined. In this case, hafnium dioxide was added to a calcined cake wherein the calcined cake composed of basic ingredients, $MnO_2$ and $SiO_2$ which were pulverized by using wet ball mill, rather than adding hafnium to the starting material. Other methods of preparation are quite the same as in the case of compositions in Table 3. The results of the addition of small amounts of hafnium dioxide after calcination are summarized in Table 4. As base material compositions, three types of weight formulae were adopted: $BaTiO_3+xHfO_2$, $(Ba_{0.77}Sr_{0.23})TiO_3+xHfO_2$ and $(Ba_{0.93}Pb_{0.07})TiO_3+xHfO_3$ with additives of $7\times10^{-4}$ mole $MnO_2$ and 0.024 mole $SiO_2$ to one mole of barium titanate and its solid solution. In each type of basic composition, the additions of hafnium dioxide larger than 0.0005 mole to one mole of barium titanate and its solid solution were effective to improve the positive temperature coefficients. As is apparent from the comparison between Nos. 3 and 4 in Table 3 and Nos. 6 and 7 in Table 4 for instance, the positive temperature coefficients were almost the same in both methods of preparation in the case of the same amount of addition, but the latter method (adding Hf after calcination) showed an advantage in that room temperature resistivity was smaller than that in the former method (adding Hf in the starting material mixture). When hafnium dioxide was added in an amount of from 0.001 to 0.003 mole to one mole of barium titanate and its solid solution, positive temperature coefficients showed the highest values which were larger than the maximum values in the former method. From an economical standpoint, in view of the expenses of hafnium dioxide, addition of small amounts after calcination are condidered to be better. A very small addition amount of Hf which was effective for PTC in the case of the latter method was not effective for PTC in the case of the former method.

Table 5 shows an effect of excess and lack of titanium dioxide as compared with almost stoichiometric $(BaSr)TiO_3$ as shown in No. 3 in Table 5. Hafnium dioxide was also added after calcination also in this case. A lack of and an excess of $TiO_2$ between 0.99 and 1.05 mole from 1.00 mole did not cause the material to be changed in electrical properties, but in an excess of $TiO_2$ from 1.00 mole, e.g. between 1.01 and 1.05 mole, rather lower resistivities compared with a stoichiometric composition and small grained dense ceramics were observed. A lack of $TiO_2$, at 0.98 mole, and an excess of $TiO_2$, at 1.08 mole, showed an unfavorable increase of resistivities and a decrease of positive temperature coefficients.

In other basic material compositions including $SnO_2$, similar results described above in Table 3,4 and 5 were observed.

A substitution of Sn for Ti decreased the Curie temperature of barium titanate, and therefore substitution of Sn can be used instead of that of Sr, but rather higher resistivity compared with a substitution of Sr was observed. Amounts of substitution of Sr, Pb and Sn for Ba and Ti, respectively, should be limited in a range where the solid solutions can be made semiconductive. These substitution amounts are known as a rule to be less than 70 mole % for $SrTiO_3$, less than 25 mole % for $BaSnO_3$ and less than 80 mole % for $PbTiO_3$.

The PTC thermistors developed in this invention were quite reproducible and useful for the temperature controlling elements using its sharp switching characteristics because of high positive temperature coefficient.

Table 1

| No. | Basic composition (mole) BaO | TiO₂ | Semiconducting element (mole) Nb₂O₅ | Ta₂O₅ | Bi₂O₃ | Sb₂O₃ | La₂O₃ | Sm₂O₃ | Gd₂O₃ | Additive (mole) HfO₂ | Onset Temp. (°C) | Room Temperature Resistivity (Ω-cm) | Positive Temperature Coefficient (%/°C) | Rmax/Rmin |
|---|---|---|---|---|---|---|---|---|---|---|---|---|---|---|
| 1 | 1 | 1 | 0.001 | | | | | | | — | 120 | 13 | 8 | 2.1×10² |
| 2 | 1 | 0.999 | 0.001 | | | | | | | 0.001 | 120 | 15 | 9 | 2.8×10² |
| 4 | 1 | 0.995 | 0.001 | | | | | | | 0.005 | 117 | 19 | 14 | 7.7×10⁴ |
| 5 | 1 | 0.99 | 0.001 | | | | | | | 0.01 | 115 | 24 | 16 | 1.6×10⁵ |
| 6 | 1 | 0.95 | 0.001 | | | | | | | 0.05 | 95 | 36 | 18 | 2.9×10⁵ |
| 7 | 1 | 0.90 | 0.001 | | | | | | | 0.10 | 70 | 150 | 13 | 1.8×10⁴ |
| 8 | 1 | 0.85 | 0.001 | | | | | | | 0.15 | 45 | 2.6×10³ | 7 | 2.4×10² |
| 9 | 1 | 1 | | 0.001 | | | | | | — | 120 | 15 | 7 | 2.9×10² |
| 10 | 1 | 0.95 | | 0.001 | | | | | | 0.05 | 95 | 33 | 18 | 1.8×10⁵ |
| 11 | 1 | 1 | | | 0.0012 | | | | | — | 120 | 21 | 8 | 2.4×10² |
| 12 | 1 | 0.95 | | | 0.0012 | | | | | 0.05 | 95 | 39 | 17 | 1.0×10⁵ |
| 13 | 1 | 1 | | | | 0.001 | | | | — | 120 | 10 | 9 | 2.1×10² |
| 14 | 1 | 0.95 | | | | 0.001 | | | | 0.05 | 95 | 22 | 18 | 1.6×10⁵ |
| 15 | 1 | 1 | | | | | 0.001 | | | — | 120 | 14 | 7 | 1.9×10² |
| 16 | 1 | 0.95 | | | | | 0.001 | | | 0.05 | 95 | 30 | 16 | 1.9×10⁵ |
| 17 | 1 | 1 | | | | | | 0.001 | | — | 120 | 13 | 8 | 1.7×10² |
| 18 | 1 | 0.95 | | | | | | 0.001 | | 0.05 | 95 | 25 | 17 | 2.0×10⁵ |
| 19 | 1 | 1 | | | | | | | 0.001 | — | 120 | 16 | 7 | 2.0×10² |
| 20 | 1 | 0.95 | | | | | | | 0.001 | 0.05 | 95 | 28 | 16 | 2.1×10⁵ |

Table 2

| No. | Basic composition (mole) BaO | TiO₂ | Semiconducting element (mole) Nb₂O₅ | Additive (mole) MnO₂ | SiO₂ | HfO₂ | Onset Temp. (°C) | Room Temperature Resistivity (Ω-cm) | Positive Temperature coefficient (%/°C) | Rmax/Rmin | Average Grain Size (μm) | Break down Voltage (13 mm × 2.5 mm) (V) |
|---|---|---|---|---|---|---|---|---|---|---|---|---|
| 1 | 1 | 0.95 | 0.0001 | — | — | 0.05 | 95 | 6.5×10³ | 5 | 4.3×10¹ | | |
| 2 | 1 | 0.95 | 0.0005 | — | — | 0.05 | 95 | 45 | 18 | 1.8×10⁵ | | |

Table 2-continued

| No. | Basic composition (mole) BaO | TiO₂ | Semiconducting element (mole) Nb₂O₅ | Additive (mole) MnO₂ | SiO₂ | HfO₂ | Onset Temp. (°C) | Room Temperature Resistivity (Ω-cm) | Positive Temperature coefficient (%/°C) | Rmax/Rmin | Average Grain Size (μm) | Break down Voltage (13 mm × 2.5 mm) (V) |
|---|---|---|---|---|---|---|---|---|---|---|---|---|
| 3 | 1 | 0.95 | 0.001 | — | — | 0.05 | 95 | 36 | 18 | 2.9×10⁵ | | |
| 4 | 1 | 0.95 | 0.0013 | — | — | 0.05 | 95 | 37 | 17 | 2.7×10⁵ | | |
| 5 | 1 | 0.95 | 0.0016 | — | — | 0.05 | 94 | 41 | 17 | 2.1×10⁵ | | |
| 6 | 1 | 0.95 | 0.0020 | — | — | 0.05 | 93 | 195 | 14 | 9.8×10⁴ | | |
| 7 | 1 | 0.95 | 0.0025 | — | — | 0.05 | 92 | 8.1×10⁵ | 4 | 1.3×10¹ | | |
| 8 | 1 | 0.95 | 0.001 | 5×10⁻⁵ | — | 0.05 | 95 | 63 | 19 | 3.5×10⁵ | | |
| 9 | 1 | 0.95 | 0.001 | 1×10⁻⁴ | — | 0.05 | 95 | 130 | 25 | 2.4×10⁶ | | |
| 10 | 1 | 0.95 | 0.001 | 3×10⁻⁴ | — | 0.05 | 95 | 210 | 30 | 6.7×10⁶ | | |
| 11 | 1 | 0.95 | 0.0011 | 7×10⁻⁴ | — | 0.05 | 95 | 330 | 35 | 7.0×10⁶ | | |
| 12 | 1 | 0.95 | 0.0013 | 1×10⁻³ | — | 0.05 | 95 | 370 | 33 | 4.6×10⁶ | | |
| 13 | 1 | 0.95 | 0.0018 | 1.5×10⁻³ | — | 0.05 | 94 | 580 | 20 | 1.8×10⁶ | | |
| 14 | 1 | 0.95 | 0.0023 | 2.0×10⁻³ | — | 0.05 | 93 | 7.3×10⁴ | 13 | 3.3×10¹ | | |
| 15 | 1 | 0.95 | 0.0011 | 7×10⁻⁴ | 0.001 | 0.05 | 95 | 320 | 34 | 6.9×10⁶ | 30 | 370 |
| 16 | 1 | — | 0.0011 | 7×10⁻⁴ | 0.006 | 0.05 | 95 | 280 | 33 | 5.2×10⁶ | 10 | 610 |
| 17 | 1 | — | 0.0011 | 7×10⁻⁴ | 0.012 | 0.05 | 95 | 230 | 32 | 4.4×10⁶ | 8 | 730 |
| 18 | 1 | — | 0.0011 | 7×10⁻⁴ | 0.024 | 0.05 | 95 | 210 | 32 | 3.1×10⁶ | 6 | 800 |
| 19 | 1 | — | 0.0011 | 7×10⁻⁴ | 0.050 | 0.05 | 95 | 270 | 29 | 1.1×10⁶ | 8 | 880 |
| 20 | 1 | — | 0.0011 | 7×10⁻⁴ | 0.10 | 0.05 | 95 | 4.8×10⁴ | 15 | 1.0×10⁴ | 45 | 71000 |
| 21 | 1 | 1 | 0.0011 | 7×10⁻⁴ | — | — | 120 | 110 | 25 | 7.5×10⁵ | | |
| 22 | 1 | 1 | 0.0011 | 7×10⁻⁴ | 0.024 | — | 120 | 70 | 23 | 5.2×10⁵ | | |

Table 3

| No. | Basic Composition (mole) BaO | SrO | PbO | TiO₂ | Semiconducting (mole) Nb₂O₅ | Additive (mole) MnO₂ | SiO₂ | HfO₂ | Onset Temperature (°C) | Positive Temperature Coefficient (%/°C) | Room Temperature Resistivity (Ω-cm) |
|---|---|---|---|---|---|---|---|---|---|---|---|
| 1 | 1 | — | — | 1 | 0.0011 | 0.0007 | 0.024 | — | 120 | 23 | 70 |
| 2 | 1 | — | — | 0.999 | 0.0011 | 0.0007 | 0.024 | 0.001 | 120 | 23 | 80 |
| 3 | 1 | — | — | 0.995 | 0.0011 | 0.0007 | 0.024 | 0.005 | 117 | 27 | 85 |
| 4 | 1 | — | — | 0.99 | 0.0011 | 0.0007 | 0.024 | 0.01 | 115 | 28 | 105 |
| 5 | 1 | — | — | 0.95 | 0.0011 | 0.0007 | 0.024 | 0.05 | 95 | 32 | 210 |
| 6 | 1 | — | — | 0.90 | 0.0011 | 0.0007 | 0.024 | 0.10 | 70 | 25 | 330 |
| 7 | 1 | — | — | 0.85 | 0.0011 | 0.0007 | 0.024 | 0.15 | 45 | 10 | 1.5×10⁴ |
| 8 | 0.77 | 0.23 | — | 1 | 0.0011 | 0.0007 | 0.024 | — | 50 | 13 | 50 |
| 9 | 0.77 | 0.23 | — | 0.999 | 0.0011 | 0.0007 | 0.024 | 0.001 | 50 | 13 | 52 |
| 10 | 0.78 | 0.22 | — | 0.995 | 0.0011 | 0.0007 | 0.024 | 0.005 | 50 | 18 | 66 |
| 11 | 0.79 | 0.21 | — | 0.99 | 0.0011 | 0.0007 | 0.024 | 0.01 | 50 | 20 | 95 |
| 12 | 0.84 | 0.16 | — | 0.95 | 0.0011 | 0.0007 | 0.024 | 0.05 | 50 | 23 | 153 |
| 13 | 0.91 | 0.09 | — | 0.90 | 0.0011 | 0.0007 | 0.024 | 0.10 | 50 | 20 | 215 |
| 14 | 1 | — | — | 0.85 | 0.0011 | 0.0007 | 0.024 | 0.14 | 50 | 11 | 1.1×10⁴ |
| 15 | 0.93 | — | 0.07 | 1 | 0.0011 | 0.0007 | 0.024 | — | 150 | 12 | 48 |
| 16 | 0.93 | — | 0.07 | 0.999 | 0.0011 | 0.0007 | 0.024 | 0.001 | 150 | 12.5 | 48 |
| 17 | 0.925 | — | 0.075 | 0.995 | 0.0011 | 0.0007 | 0.024 | 0.005 | 150 | 16 | 57 |
| 18 | 0.92 | — | 0.08 | 0.99 | 0.0011 | 0.0007 | 0.024 | 0.01 | 150 | 18 | 88 |
| 19 | 0.87 | — | 0.13 | 0.95 | 0.0011 | 0.0007 | 0.024 | 0.05 | 150 | 21 | 113 |
| 20 | 0.81 | — | 0.19 | 0.90 | 0.0011 | 0.0007 | 0.024 | 0.1 | 150 | 20 | 186 |
| 21 | 0.74 | — | 0.26 | 0.85 | 0.0011 | 0.0007 | 0.024 | 0.15 | 150 | 20 | 4.5×10³ |

Table 4

| No. | Basic Composition (mole) BaO | SrO | PbO | TiO₂ | Semiconducting (mole) Nb₂O₅ | Additive (mole) MnO₂ | SiO₂ | HfO₂ | Onset Temperature (°C) | Positive Temperature coefficient (%/°C) | Room Temperature Resistivity (Ω-cm) |
|---|---|---|---|---|---|---|---|---|---|---|---|
| 1 | 1 | — | — | 1 | 0.0011 | 0.0007 | 0.024 | — | 120 | 23 | 70 |
| 2 | 1 | — | — | 1 | 0.0011 | 0.0007 | 0.024 | 0.0001 | 120 | 23.5 | 70 |
| 3 | 1 | — | — | 1 | 0.0011 | 0.0007 | 0.024 | 0.0005 | 120 | 27 | 71 |
| 4 | 1 | — | — | 1 | 0.0011 | 0.0007 | 0.024 | 0.001 | 118 | 29 | 73 |
| 5 | 1 | — | — | 1 | 0.0011 | 0.0007 | 0.024 | 0.003 | 117 | 33 | 77 |
| 6 | 1 | — | — | 1 | 0.0011 | 0.0007 | 0.024 | 0.005 | 115 | 28 | 80 |
| 7 | 1 | — | — | 1 | 0.0011 | 0.0007 | 0.024 | 0.01 | 110 | 27 | 95 |
| 8 | 0.77 | 0.23 | — | 1 | 0.0011 | 0.0007 | 0.024 | — | 50 | 13 | 50 |
| 9 | 0.77 | 0.23 | — | 1 | 0.0011 | 0.0007 | 0.024 | 0.0001 | 50 | 13 | 50 |
| 10 | 0.77 | 0.23 | — | 1 | 0.0011 | 0.0007 | 0.024 | 0.0005 | 50 | 23 | 50 |
| 11 | 0.77 | 0.23 | — | 1 | 0.0011 | 0.0007 | 0.024 | 0.001 | 48 | 24 | 51 |
| 12 | 0.77 | 0.23 | — | 1 | 0.0011 | 0.0007 | 0.024 | 0.003 | 47 | 25 | 60 |
| 13 | 0.77 | 0.23 | — | 1 | 0.0011 | 0.0007 | 0.024 | 0.005 | 46 | 20 | 62 |
| 14 | 0.77 | 0.23 | — | 1 | 0.0011 | 0.0007 | 0.024 | 0.01 | 45 | 21 | 90 |
| 15 | 0.93 | — | 0.07 | 1 | 0.0011 | 0.0007 | 0.024 | — | 150 | 12 | 48 |
| 16 | 0.93 | — | 0.07 | 1 | 0.0011 | 0.0007 | 0.024 | 0.0001 | 150 | 13 | 48 |
| 17 | 0.93 | — | 0.07 | 1 | 0.0011 | 0.0007 | 0.024 | 0.0005 | 150 | 18 | 48 |
| 18 | 0.93 | — | 0.07 | 1 | 0.0011 | 0.0007 | 0.024 | 0.001 | 148 | 22 | 48 |
| 19 | 0.93 | — | 0.07 | 1 | 0.0011 | 0.0007 | 0.024 | 0.003 | 147 | 23 | 51 |
| 20 | 0.93 | — | 0.07 | 1 | 0.0011 | 0.0007 | 0.024 | 0.005 | 146 | 19 | 55 |
| 21 | 0.93 | — | 0.07 | 1 | 0.0011 | 0.0007 | 0.024 | 0.01 | 144 | 18 | 84 |

Table 5

| No. | Basic Composition (mole) BaO | SrO | TiO$_2$ | Semi-conducting element (mole) Nb$_2$O$_5$ | Additive (mole) MnO$_2$ | SiO$_2$ | HfO$_2$ | Onset Temperature (°C) | Positive Temperature Coefficient (%/°C) | Room Temperature Resistivity (Ω-cm) |
|---|---|---|---|---|---|---|---|---|---|---|
| 1 | 0.77 | 0.23 | 0.98 | 0.0011 | 0.0007 | 0.024 | 0.001 | 48 | 14 | 1.1×10$^3$ |
| 2 | 0.77 | 0.23 | 0.99 | 0.0011 | 0.0007 | 0.024 | 0.001 | 48 | 20 | 83 |
| 3 | 0.77 | 0.23 | 1.0 | 0.0011 | 0.0007 | 0.024 | 0.001 | 48 | 24 | 51 |
| 4 | 0.77 | 0.23 | 1.01 | 0.0011 | 0.0007 | 0.024 | 0.001 | 48 | 24 | 47 |
| 5 | 0.77 | 0.23 | 1.02 | 0.0011 | 0.0007 | 0.024 | 0.001 | 48 | 23 | 45 |
| 6 | 0.77 | 0.23 | 1.03 | 0.0011 | 0.0007 | 0.024 | 0.001 | 48 | 23 | 45 |
| 7 | 0.77 | 0.23 | 1.05 | 0.0011 | 0.0007 | 0.024 | 0.001 | 48 | 22 | 50 |
| 8 | 0.77 | 0.23 | 1.08 | 0.0011 | 0.0007 | 0.024 | 0.001 | 48 | 13 | 2.1×10$^4$ |

What is claimed is:

1. A PTC thermistor composition consisting essentially of a first oxide selected from the group consisting of barium oxide, barium strontium oxide, and barium lead oxide, and, on the basis of 1.00 mole of said first oxide, (A) 0.90 to 1.05 mole of an oxide selected from the group consisting of titanium dioxide and titanium stannic dioxide, (B) 0.0005 to 0.002 mole of an oxide selected from the group consisting of rare earth oxides, Nb$_2$O$_5$, Ta$_2$O$_5$, Bi$_2$O$_3$ and Sb$_2$O$_3$ and (C) 0.0005 to 0.10 mole of hafnium dioxide.

2. A PTC thermistor composition according to claim 1, wherein the PTC thermistor composition consists essentially of
a first oxide selected from the group consisting barium oxide, barium strontium oxide, and barium lead oxide, and, on the basis of 1.00 mole of said first oxide, (A) 0.90 to 1.05 mole of an oxide selected from the group consisting of titanium dioxide and titanium stannic dioxide, (B) 0.0005 to 0.002 mole of an oxide selected from the group consisting of rare earth oxides, Nb$_2$O$_5$, Ta$_2$O$_5$, Bi$_2$O$_3$ and Sb$_2$O$_3$, (C) 0.0005 to 0.10 mole of hafnium dioxide, and (D) 1×10$^{-4}$ to 1.5×10$^{-3}$ mole of manganese oxide.

3. A PTC thermistor composition according to claim 1, wherein said barium strontium oxide is (1−x)BaO.xSrO wherein $x$ is smaller than 0.70.

4. A PTC thermistor composition according to claim 1, wherein said barium lead oxide is (1−x)BaO.xPbO wherein $x$ is smaller than 0.80.

5. A PTC thermistor composition according to claim 1, wherein said titanium stannic dioxide is (1−x)TiO$_2$.xSnO$_2$ wherein $x$ is smaller than 0.25.

6. A PTC thermistor composition according to claim 2, which further comprises 0.006 to 0.050 mole of SiO$_2$ on the basis of 1.00 mole of said first oxide.

7. A method of making a PTC thermistor comprising: preparing a mixture consisting of a first oxide selected from the group consisting of barium oxide, barium strontium oxide, and barium lead oxide, and, on the basis of 1.00 mole of said first oxide, (A) 0.90 to 1.05 mole of an oxide selected from the group consisting of titanium dioxide and titanium stannic dioxide, and (B) 0.0005 to 0.002 mole of an oxide selected from the group consisting of rare earth oxides, Nb$_2$O$_5$, Ta$_2$O$_5$, Bi$_2$O$_3$ and Sb$_2$O$_3$ and (D) 1×10$^{-4}$ to 1.5×10$^{-3}$ mole of manganese oxide; calcining the thus prepared mixture at a temperature of 900° to 1250°C; milling the thus calcined material with an addition of (C) 0.0005 to 0.10 mole of hafnium dioxide on the basis of 1.00 mole of said first oxide; pressing the thus milled material mixed with the hafnium dioxide into a pressed body; firing the thus obtained pressed body at a temperature of 1240°C to 1400°C for 0.5 to 5 hours; cooling the thus fired body to 400°C at a cooling rate lower than 300°C per hour; and thereafter furnace-cooling the thus cooled body to room temperature.

* * * * *